March 9, 1943.   I. COWLES   2,313,323
INJECTOR TUBE COUPLING MEANS
Filed Jan. 27, 1941
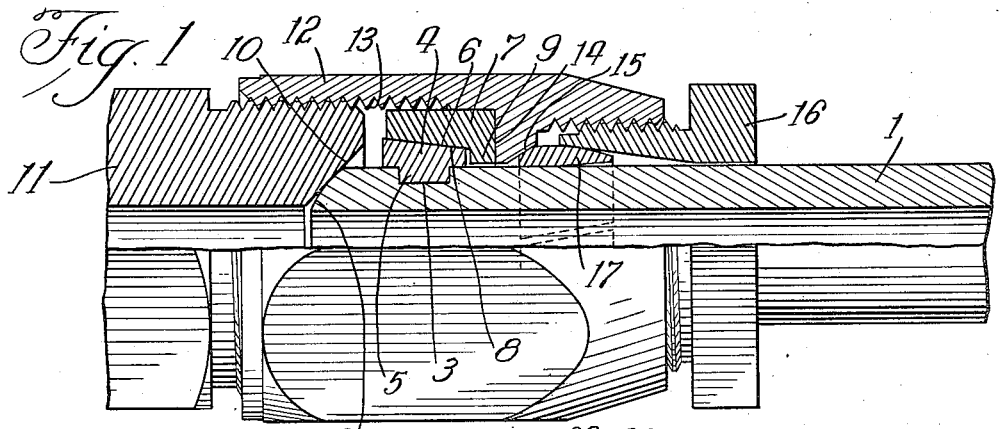
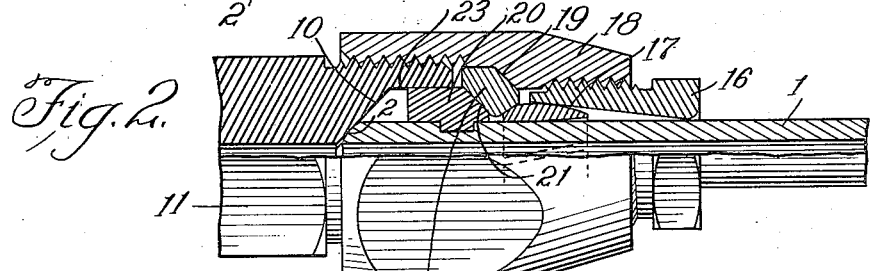
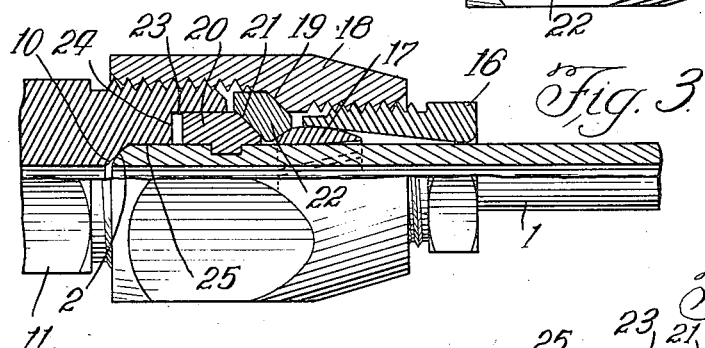
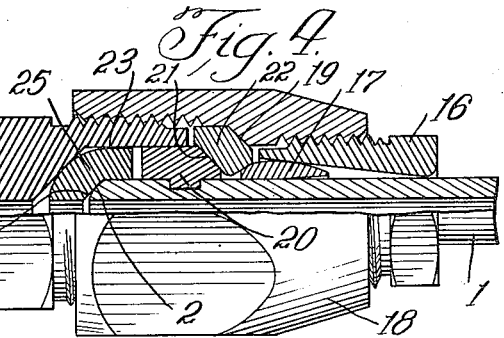
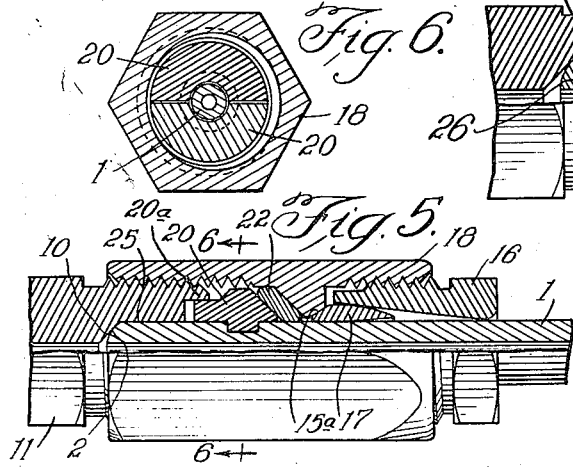
Inventor:
Irving Cowles
By Rudolph M. Lotz
Att'y.

Patented Mar. 9, 1943

2,313,323

UNITED STATES PATENT OFFICE 2,313,323

INJECTOR TUBE COUPLING MEANS

Irving Cowles, Detroit, Mich.

Application January 27, 1941, Serial No. 376,190

8 Claims. (Cl. 285—87)

This invention relates to improvements in the type of tubes and coupling means for connecting the same with the fuel supply means for and the fuel receiving parts of a Diesel or Diesel-type engine and for other high-pressure fluid transmission structures; and has for its main object to provide a structure of the type specified, wherein the ends of said tubes are firmly held seated against leakage and wherein the means for maintaining said tubes so seated are relieved of stresses imposed by the extremely high pressures to which they are subjected and which tend to move the seated ends of the tubes away from their seats.

In the Diesel type engines, fluids under extremely high pressure are injected into the cylinders with great frequency, the said pressures being seven thousand or more pounds per square inch and the frequency of injection being five thousand per minute, more or less.

To meet the needs imposed by the said pulsating pressures, which are comparable to the most intense vibrations and which cause crystallization of the metals of which tubings are generally made, it has been necessary to develop an alloy for the production of such injector tubing which is substantially lead soft and will not crystallize and break responsively to said pulsating pressures. The soft nature of said metal requires the tubes made of same to have very thick walls compared with the diameters of their ducts and this softness has presented a very difficult problem with respect to coupling the same with the engines and sources of fluids to be injected into the cylinders thereof, due to the fact that said alloy shears easily and cannot be condensed as by upsetting the ends of the tubes to form sleeve-nut engaging coupling collars thereon without rendering the same brittle. This upsetting has been resorted to seemingly, as the only available means for effecting coupling of the tubes by means of a sleeve nut engaged with the resulting heads. The latter break off after a short period of use and require replacement of the tubes which are very expensive.

The object of the present invention is to provide tubes and couplings therefor which, in their assembled relation, constitute metal conduits that are cheaper than those heretofore used and which will be of far longer life.

Suitable embodiments of the invention are illustrated in the accompanying drawing, wherein:

Fig. 1 is in part, a side elevation and in part a central longitudinal sectional view of a conduit constructed in accordance with the invention.

Fig. 2 is a view similar to Fig. 1 illustrating another embodiment of the invention.

Fig. 3 is a view similar to Fig. 2 showing a modified form of the structure of said Fig. 2.

Fig. 4 is a view similar to Fig. 2, wherein a thimble is disposed about the end portion of the tube.

Fig. 5 is a view similar to Figs. 2, 3 and 4 illustrating a further structural modification.

Fig. 6 is a transverse sectional view taken on the line 6—6 of Fig. 5.

In each of the several views above described, the tube 1 is equipped with a tapered end 2 and with an annular groove 3 spaced appreciably from said tapered end.

In every instance a collar 4 consisting of two substantially semi-circular parts, each equipped between its ends with a rib 5 of a width and depth equal to that of the groove 3, embraces the tube 1 within said groove and beyond the end walls thereof.

In the structure of Fig 1 the collar 4 differs from those of Figs. 2 to 5 inclusive in that it is of truncated cone shape of very slight taper, as indicated by its outer surface 6, said collar being received within the ring 7 having a similarly tapered inner surface 8 which is longer than the surface 6 and of smaller diameter where it meets the flange 9 of said ring than the smallest diameter of said collar 4.

The tapered end 2 of the tube 1 of Fig. 1 seats upon the seat 10 of the male member 11 of the coupling which may be an integral part of the source of fluid or of the engine body.

Said member 11 is threaded externally for engagement with the sleeve nut 12 having a large diameter bore 13 terminating at the annular shoulder 14 of the inwardly projecting flange 15 of said sleeve nut, and a smaller diameter threaded bore beyond the flange 15 which receives the sleeve nut 16. The bore of said nut 16 is tapered at an angle of approximately seven degrees to the axis of said nut and embraces a split collar 17 composed of resilient steel or other hard metal.

The inner edge of the flange 15 of the nut 12 is tapered to receive an end portion of the split collar 17 which is of greater thickness than the other end portion of said collar which is externally arcuate on a gradually decreasing radius from the last-named end portion to the terminus thereof engaged in said tapered portion of said flange 15. The bore of said collar is cylindrical throughout at least one-half of its length wherein it is of greatest thickness, the remainder of said bore being slightly flared on a very long arc.

The outer shaping of said collar 17 is such that the bore of the nut 16 has what may be termed a "line contact" with the same at a point opposed to the cylindrical portion of its bore when the said collar is contracted into close embracing relation to the tube 1.

The ring or sleeve 7 is received telescopically within the larger bore portion of the nut 12 and when the latter is rotated clockwise, said sleeve 7 will contract the two piece collar 4 to hug the tube 1 and will also move the collar and the tube to seat the end 2 of the latter upon the seat 10, this operation being performed before the nut 16 contracts the split collar 17.

After the tube end is seated under compression, the nut 16 is rotated clockwise to contract the collar 17 and force it at the same time into engagement with tapered end of the flange 15, the nut 16 being further rotated to increase its hold upon the tube 1 and to so firmly engage the collar 17 frictionally with wedge action as to prevent any loosening of its hold under the influence of vibration and temperature changes or other stresses.

The sleeve nut 12 is thus locked against any possible movement to relieve the pressure of the tube end against the seat 10.

The weakening of the tube by the annular groove 3 is compensated for by the collar 4 to prevent bursting of the tube at this point. Furthermore, the flanges of the collar 4 embracing the tube at each side of the recess 3 and which are held tightly engaged with the tube by the ring or sleeve 7, will prevent any upsetting or flow of metal from the wall of the recess 3 nearest the end 2 of the tube toward said end.

The high pressure of fluids passing through the tube 1 impart a longitudinal stress to the tube throughout its length which, in the absence of the split collar 17 would be required to be carried by the last-mentioned wall of the recess 3, except insofar as the collar 4 and ring or sleeve 7 affords relief from said stress.

The collar 17 thus performs two main functions, one of which is to relieve the portion of the tube between the end 2 and said collar 17 of the longitudinal stresses to which said portion is subject, and the other being to lock the nut 12 against loosening as above described.

A third function of the collar 17 is to distribute vibration stresses over an appreciable area of the tube within the tapered bore portion of said collar 17, as opposed to a sharp line of demarkation between the tube and the end of a split collar equipped with a cylindrical bore throughout its length.

In each of the structures of Figs. 2 to 5 inclusive, the sleeve nut 18 is equipped with a large and a smaller bore portion and with an inclined surface 19 between said bores. The two piece collars 20 of each of said structures is cylindrical externally and said cylindrical surface meets a tapered surface 21 opposed to and parallel with the surface or shoulder 19 of the sleeve nut 18. The inclination of said surface 19 and 21 is preferably about 45° to the axis of the sleeve nut and between them there is disposed an unsplit ring or collar 22 having similarly inclined faces, said ring being cylindrical externally and of a diameter equal to that of the large bore portion of the nut 18. The bore of the collar 22 is tapered at an angle of about 35° to its axis and receives the thicker end portion of the split collar 17, thus performing the function of the tapered inner edge of the flange 15 of the nut 12 in cooperation with the sleeve nut 16.

In each of the structures of Figs. 2 to 5 inclusive, the ring or collar 22 exerts a wedge-like pressure upon the two piece collar 4 to effect contraction of the latter to hug the tube 1 and in each instance seat 10 of the male member 11 is bordered by a cylindrical flange 23 which telescopically engages the other end portion of the collar 4 and prevents spreading apart of its component parts.

In the structure of Fig. 2 the flange 23 meets the tapered seat surface 10, whereas in Fig. 3, said flange 23 terminates at the shoulder 24 bordering the upper end of a smaller bore portion 25 of said flange which snugly receives the seat end portion of the tube 1 and serves to reinforce the same.

In the structure of Fig. 4 the flange 23 is the same as in Fig. 2 and the free space between said flange and the tube 1 is filled by a thimble or ferrule 25 which seats upon the seat 10 and is equipped with a seat 26 upon which the end 2 of the tube 1 seats.

In each instance the stresses which tend to move the tube 1 away from its seat are greatly reduced by the hold of the split collar 17 which functions mainly to relieve completely the stress on the shoulder of the annular recess in the groove of said tube nearest its end which, because of the soft nature of the metal of the tube 1 is in danger of being deformed by the high pressures to which the tube is subjected and which, in the absence of said collar 17, bears substantially all of the pressure necessary to retain the said tube seated.

The recess of the tube, obviously, weakens the same so that the high pressure within said tube may cause expansion of the thinner wall portion, thus presented, and for that reason, the substantially annular rib of the two-piece collar is made to fill said recess to the extent necessary to limit expansion of the said thin wall portion to the degree required to prevent fracture, thus allowing the end portions of said collar to be made of a very slightly less radius than that of the tube, so that said collar may be clamped forcibly against the tube and obtain such a strong frictional hold thereon as will serve to cause said collar to take up some of the longitudinal stresses on the tube between the seat and the point in said two-piece collar farthest removed from said seat. It is also necessary that the pressure on the said collar shall be so limited as to prevent it from contracting the duct of the tube and to this end the two parts of said collar spaced apart so slightly that they will meet before any contraction of the tube can possibly result.

The structure of Fig. 5 is similar to that of Fig. 1 in that the sleeve nut 18 thereof is equipped between its ends with the internal annular flange 15a. The latter differs from the similar flange 15 of Fig. 1 only in that it has the inclined face engaged with a ring member 22 which is substantially identical with the similar ring members 22 of Figs. 2, 3 and 4.

The twopiece collar 20 of Fig. 5 is identical with the collars 20 of Figs. 2, 3 and 4, its seat opposed end being received telescopically within the annular flange 20a which is spaced from the bore of the male member 11 which receives the tube 1 telescopically and borders the seat 10.

In all other respects the structure of Fig. 5 is identical with that of Fig. 1.

Insofar as Fig. 6 shows the two-piece collar, it constitutes a sectional view of the collars 4 and 20 of Figs. 1 and 2, 3 and 4, in that it shows a slight gap between the meeting faces of said collar.

I claim as my invention:

1. An all metal conduit including a seat member, a length of pipe seated at one end thereon and equipped adjacent said end with an annular groove, a multi-piece collar having a longitudinal gap therein and equipped between its ends with a rib engaged in said groove for engagement with portions of the pipe adjacent the respective ends of said groove, a sleeve nut having threaded engagement with said seat member, and means on said collar and within said sleeve nut co-operating with each other to maintain said collar clamped in firm engaging relation to the pipe and effecting and maintaining seating of said pipe end as said nut attains one limit of its movement with respect to the seat member without effecting complete closure of the gap in said collar.

2. A coupling for a metal tube equipped with a seat end and with an annular groove adjacent said end comprising a member equipped with a seat for the tube end, a sleeve nut having threaded engagement with said member, a multi-piece separable collar of greater length than said groove and equipped between its ends with a substantially annular rib formation to engage in said groove adapted to be disposed about the tube to embrace the same in bridging relation to said groove and having gaps therein when so disposed about said tube, said collar equipped with a substantially annular tapered surface along the end portion thereof farthest spaced from the seat end of the tube, and a means within said sleeve nut longitudinally movable therewith in the direction of said seat member engageable with said tapered surface to clamp the collar upon the tube and co-operate with said collar to force the tube end upon said seat responsively to rotation of said nut in one direction.

3. A coupling for a metal tube equipped with a seat end and with an annular groove adjacent said end, comprising a member equipped with a seat for the tube end, a sleeve nut having threaded engagement with said member, a multi-piece separable collar of greater length than said groove and equipped between its ends with a substantially annular rib formation to engage in said groove adapted to be disposed about the tube to embrace the same in bridging relation to said groove and having gaps therein when so disposed about said tube, said collar equipped with a substantially annular tapered surface along the end portion thereof farthest spaced from the seat end of the tube, and a ring member rotatably mounted within and engaged with said nut for movement thereby toward said seat member and into engagement with said tapered surface, thereby to clamp said collar upon the tube and causing said collar to force the tube end upon said seat responsively to movement of said nut in one direction.

4. A coupling for an all metal conduit including a tube equipped between its ends with an annular recess and at one end with a seat formation, said coupling comprising a member equipped with a seat for said formation and adapted to be connected with a source of fluid under pressure, a collar composed of a plurality of arcuate segments each equipped with a rib between its ends for engaging in and substantially filling said recess of the tube, said segments adapted to engage the tube beyond the respective ends of said recess, a ring member engaged with said segments of said collar, said segments equipped with tapered surfaces for engagement by said ring member to clamp said segments upon the tube and force said collar and tube to seating position, a sleeve nut having threaded engagement with said first-named member and housing said collar and ring member and equipped with an internal annular shoulder engaged with said ring member to force the same and said segments and tube in the direction of said seat upon rotation of said nut in one direction with respect to said seat member.

5. An all metal conduit including a tube equipped between its ends with an annular recess and at its ends with seat formations, a pair of members adapted to be associated respectively with a source of and a receiver for fluid under pressure, plural-piece collars each equipped with a rib between its ends engaging in and substantially filling a recess of and frictionally engaged with said tube beyond the respective ends of one of said recesses, ring members engaged with said respective collars, the latter and said ring members equipped with interengaged surface formations maintaining radial and longitudinal pressure upon said collar to maintain the same contracted upon the tube and maintain the said tube seated, sleeve nuts having threaded engagement with said first-named members and housing said collars and ring members and each equipped with an internal annular shoulder engaged with a ring member and maintaining the same engaged with said collar when said nut is disposed at the limit of its movement determined by the seating of said tube, and means within said nut frictionally engaged with the same and said tube for preventing reverse rotation of said nut under the influence of vibration and temperature changes and functioning to resist longitudinal and rotary movement of the tube relatively to the nut and said first-named members.

6. An all-metal conduit comprising a tube equipped adjacent an end thereof with an annular groove, an internally substantially cylindrical diametrically collapsible collar of greater length than said tube clamped against the latter along a surface portion adjacent to and outwardly from said groove, said collar equipped with inwardly extending formations substantially filling said groove and being substantially incapable of being distorted by the stresses to which it is subjected, a seat member for the said end of said tube, a sleeve nut having thread engagement with said seat member, and an annulus within said nut engaged with an outer surface portion of said collar for maintaining the latter clamped upon said tube and maintaining the tube clamped upon the seat of said seat member.

7. A coupling for a metal tube equipped at one end with a seat formation and with an annular groove spaced from said seat formation, which comprises a member equipped with a seat for the tube end, a sleeve nut having threaded engagement with said member, a split collar within said nut of greater length than said groove and equipped with internal means substantially filling said groove when said collar is clamped upon the tube, said collar equipped with an external annular tapered surface portion, an unsplit ring member in said nut adapted to engage said surface as said nut is rotated in one direction with respect to the seat member for effecting the clamping of the collar upon the tube while also causing said collar to force the tube end upon said seat.

8. A coupling nut for an all-metal conduit including a member equipped with a seat for one end of a tube and a tube seated thereon and equipped with an annular shoulder adjacent its seat end, which comprises a sleeve nut for thread engagement with said member at one end portion and with an internal annular shoulder adjacent its other end, an unsplit ring within and engaged with said shoulder of said nut, and a diametrically contractible longitudinally gapped sleeve within said nut equipped with an external tapered surface engageable by said ring to effect contraction of said sleeve into clamping relation to the tube and equipped internally between its ends with a shoulder for engaging said shoulder of said tube.

IRVING COWLES.